(No Model.)

A. L. CUSHMAN.
LOOSE PULLEY.

No. 371,490. Patented Oct. 11, 1887.

Witnesses:
Frank J. Pillsbury
Charles Duaid

Inventor
Abe. L. Cushman

UNITED STATES PATENT OFFICE.

ABE L. CUSHMAN, OF CONCORD, NEW HAMPSHIRE.

LOOSE PULLEY.

SPECIFICATION forming part of Letters Patent No. 371,490, dated October 11, 1887.

Application filed December 8, 1886. Serial No. 220,964. (No model.)

*To all whom it may concern:*

Be it known that I, ABE L. CUSHMAN, a citizen of the United States, residing at Concord, in the county of Merrimac and State of New Hampshire, have invented a new and useful Improvement in Loose Pulleys, of which the following is a specification.

My invention relates to improvements in loose pulleys in which grooves extending longitudinally through the bearing of the pulley operate in conjunction with chambers or receptacles at opposite ends of the pulley.

The objects of my improvements are, first, to provide a continuously-lubricated bearing for the pulley; second, to provide a pulley with no packing or bushings, and yet have an automatic feed for the oil. I attain these objects by the mechanism illustrated in the accompanying drawings, in which—

Figure 1:
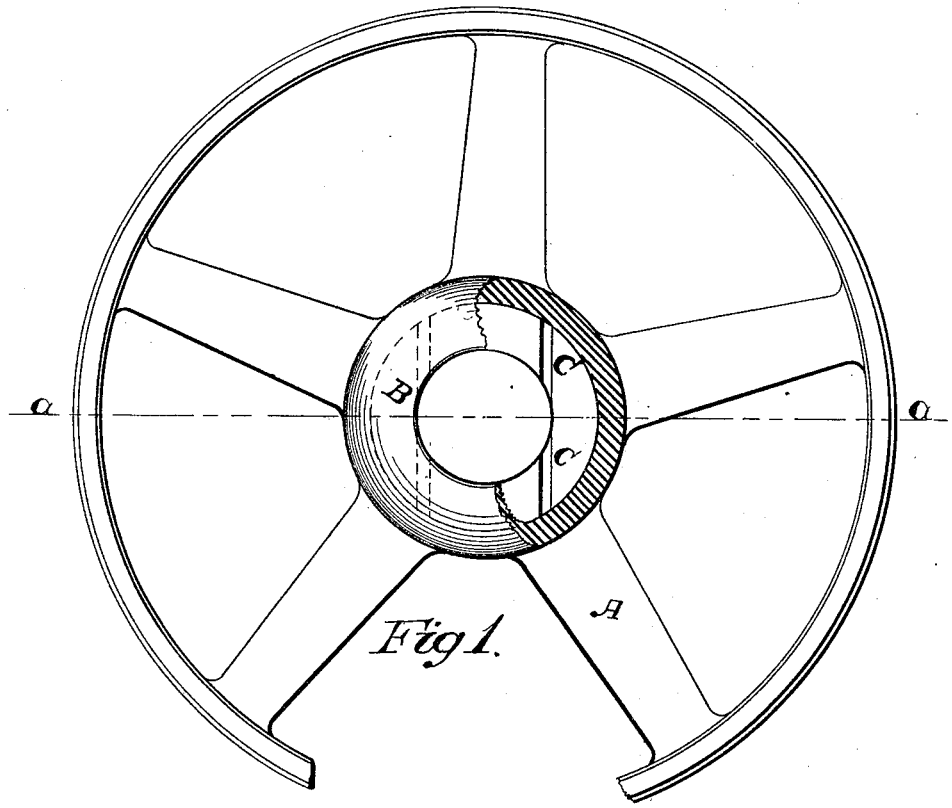
Figure 2:
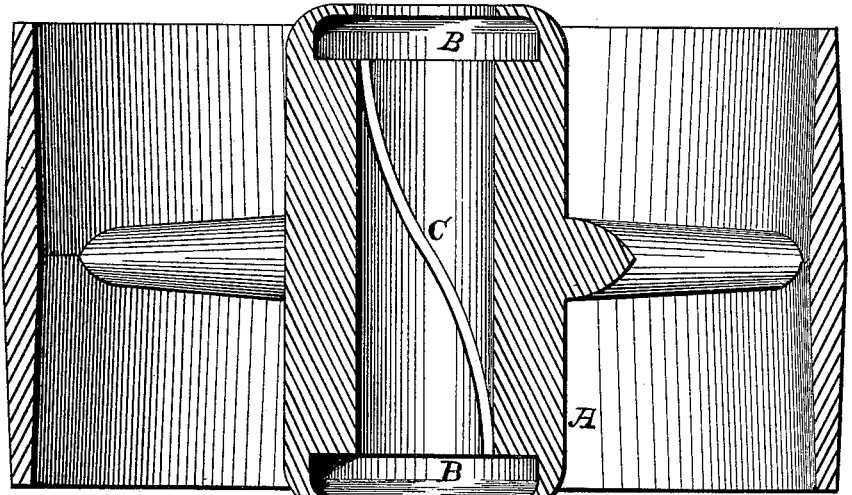

Figure 1 is an end view of the pulley with a portion of the outside end of the receptacle which holds the oil removed to show one end of the grooves passing through the pulley, the opposite ends being indicated by dotted lines; Fig. 2, a sectional view of Fig. 1 on line *a a*, showing the grooves and receptacles in one half of the pulley.

Similar letters refer to similar parts throughout the views.

The loose pulley A is provided with a chamber or receptacle, B, at either end of the hub, for containing supplies of oil, and these chambers are connected by grooves or channels C C at opposite sides of the bearing. One of these grooves feeds the oil to one end of the pulley when in motion. The other groove feeds the oil back. This keeps the oil in motion and equal in both chambers, and as the oil passes through the grooves or channels C C, in reciprocation from chamber B to chamber B, it comes in contact with the shaft on which the pulley runs and perfectly lubricates the bearing.

The chambers B B could be in any place on the bearing of the pulley and the grooves or channels C C in any shape if the oil were made to come in contact with the shaft. For instance, the chamber B could be in the center of the bearing and the grooves C, extending outwardly to the hub and then returning to the chamber B. In this case the grooves or channels would be of a diamond shape, or nearly rectangular with each other.

What I claim, and desire to secure by Letters Patent, is—

A loose pulley the hub whereof is provided with a chamber or chambers, B B, deeper than the bearing of the pulley, for holding supplies of oil, and which has longitudinally-extending grooves or channels C C communicating with the said chamber or chambers B B, all substantially as set forth.

ABE L. CUSHMAN.

Witnesses:
FRANK J. PILLSBURY,
CHARLES QUAID.